US009778101B2

(12) United States Patent
Yang et al.

(10) Patent No.: US 9,778,101 B2
(45) Date of Patent: Oct. 3, 2017

(54) OPTICAL DETECTING MODULE WITH PREFERRED LIGHT UTILIZATION EFFICIENCY

(71) Applicant: PixArt Imaging Inc., Hsin-Chu (TW)

(72) Inventors: Cheng-Lin Yang, Hsin-Chu (TW); Hung-Ching Lai, Hsin-Chu (TW); Chi-Chih Shen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 111 days.

(21) Appl. No.: 14/983,489

(22) Filed: Dec. 29, 2015

(65) Prior Publication Data

US 2017/0059397 A1 Mar. 2, 2017

(30) Foreign Application Priority Data

Sep. 2, 2015 (TW) ............................ 104128952 A

(51) Int. Cl.

*G01J 1/04* (2006.01)
*G01J 1/42* (2006.01)
*G06F 3/03* (2006.01)
*G01J 1/02* (2006.01)

(52) U.S. Cl.

CPC ........... *G01J 1/0422* (2013.01); *G01J 1/0204* (2013.01); *G01J 1/42* (2013.01); *G06F 3/0304* (2013.01); *G01J 2001/4242* (2013.01)

(58) Field of Classification Search

CPC ........ H01L 27/14; H01L 21/58; G01J 1/0422; G06F 3/0304

USPC .................................................. 250/551, 216

See application file for complete search history.

(56) References Cited

U.S. PATENT DOCUMENTS 9,171,830 B2 * 10/2015 Tran .................. H01L 31/02325
2012/0223259 A1 * 9/2012 Hashizume ........... H01L 31/173 250/551

FOREIGN PATENT DOCUMENTS

| | | |
|---|---|---|
| TW | 201108041 A1 | 3/2011 |
| TW | 201128769 A1 | 8/2011 |
| TW | 201401527 A | 1/2014 |

* cited by examiner

*Primary Examiner* — Seung C Sohn
(74) *Attorney, Agent, or Firm* — Winston Hsu

(57) ABSTRACT

An optical detecting module includes a housing, a light emitting component, an optical detecting component and an optical signal collecting component. The light emitting component is disposed inside the housing. The optical detecting component is disposed inside the housing to receive an optical detecting signal generated by the light emitting component. The optical signal collecting component is utilized to hold the light emitting component for signal collection. The optical signal collecting component includes an output portion, a bottom portion and at least one lateral portion. The light emitting component is disposed on the bottom portion, and an optical positive signal of the optical detecting signal is projected out of the housing through the output portion. The lateral portion is bent from the bottom portion to reflect an optical lateral signal of the optical detecting signal, and the optical lateral signal is projected out of the housing through the output portion.

11 Claims, 6 Drawing Sheets

10 20 16 18 22 22 22 22 22 22 22 22 A A 12 14

OPTICAL DETECTING MODULE WITH PREFERRED LIGHT UTILIZATION EFFICIENCY

BACKGROUND OF THE INVENTION

1. Field of the Invention

The present invention relates to an optical detecting module, and more particularly, to an optical detecting module with preferred light utilization efficiency.

2. Description of the Prior Art

Please refer to FIG. 1 and FIG. 2. FIG. 1 is a diagram of an optical detecting module 40 in prior art. FIG. 2 is a sectional view of the optical detecting module 40 shown in FIG. 1 along line B-B. The optical detecting module 40 includes a housing 42, a light emitting component 44 and an optical detecting component 46. The light emitting component 44 and the optical detecting component 46 are disposed inside the housing 42. The light emitting component 44 is a light emitting diode (LED) with wide-angle illumination. An optical positive signal S1 of the optical detecting signal output by the light emitting component 44 is projected upward to transmit out of the housing 42, and an optical lateral signal S2 of the optical detecting signal is projected onto an inner wall of the housing 42 and does not transmit out of the housing 42. Part of the optical detecting signal emitted from the light emitting component 44 is received by the optical detecting component 46; for example, the optical detecting component 46 receives the optical positive signal S1 but cannot receive the optical lateral signal S2. In order to maintain light receiving quantity of the optical detecting component 46 exceeding a predetermined value, energy applied to the light emitting component 44 is increased to enhance illumination, which results in energy consumption and does not conform to a trend of energy conservation and environment protection.

SUMMARY OF THE INVENTION

The present invention provides an optical detecting module with preferred light utilization efficiency for solving above drawbacks.

According to the claimed invention, an optical detecting module with preferred light utilization efficiency includes a housing, a light emitting component, an optical detecting component and an optical signal collecting component. The light emitting component is disposed inside the housing. The optical detecting component is disposed inside the housing to receive an optical detecting signal generated by the light emitting component. The optical signal collecting component is adapted to hold the light emitting component. The optical signal collecting component includes an output portion, a bottom portion and at least one lateral portion. The light emitting component is disposed on the bottom portion. An optical positive signal of the optical detecting signal is projected out of the housing through the output portion. The at least one lateral portion is bent from the bottom portion and adapted to reflect an optical lateral signal of the optical detecting signal. The optical lateral signal is turned to the output portion to project out of the housing.

According to the claimed invention, the optical detecting module further includes a lead frame disposed inside the housing, and the optical signal collecting component is formed on the lead frame. The optical detecting module further includes an optical modulating component disposed above the output portion and adapted to adjust an outputting angle of the optical detecting signal.

The present invention utilizes the optical signal collecting component to hold the light emitting component, the specific structure of the optical signal collecting component can be applied to gather and reflect the optical lateral signal output by the light emitting component, both the optical positive signal and the optical lateral signal of the optical detecting signal are projected onto the external object through the output portion, the optical lateral signal is employed effectively without consumption, and the optical detecting module can provide preferred light utilization efficiency in low-energy mode. The optical signal collecting component of the present invention can be integrated with the lead frame monolithically, or be an independent unit additionally disposed on the lead frame; for example, the optical signal collecting component may be formed on the lead frame by impact molding technique. Comparing to the prior art, the present invention disposes the optical signal collecting component inside the optical detecting module to gather the optical lateral signal output by the light emitting component, and has an advantage of the preferred light utilization efficiency because light receiving quantity of the optical detecting component is increased with low-energy consumption of the light emitting component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
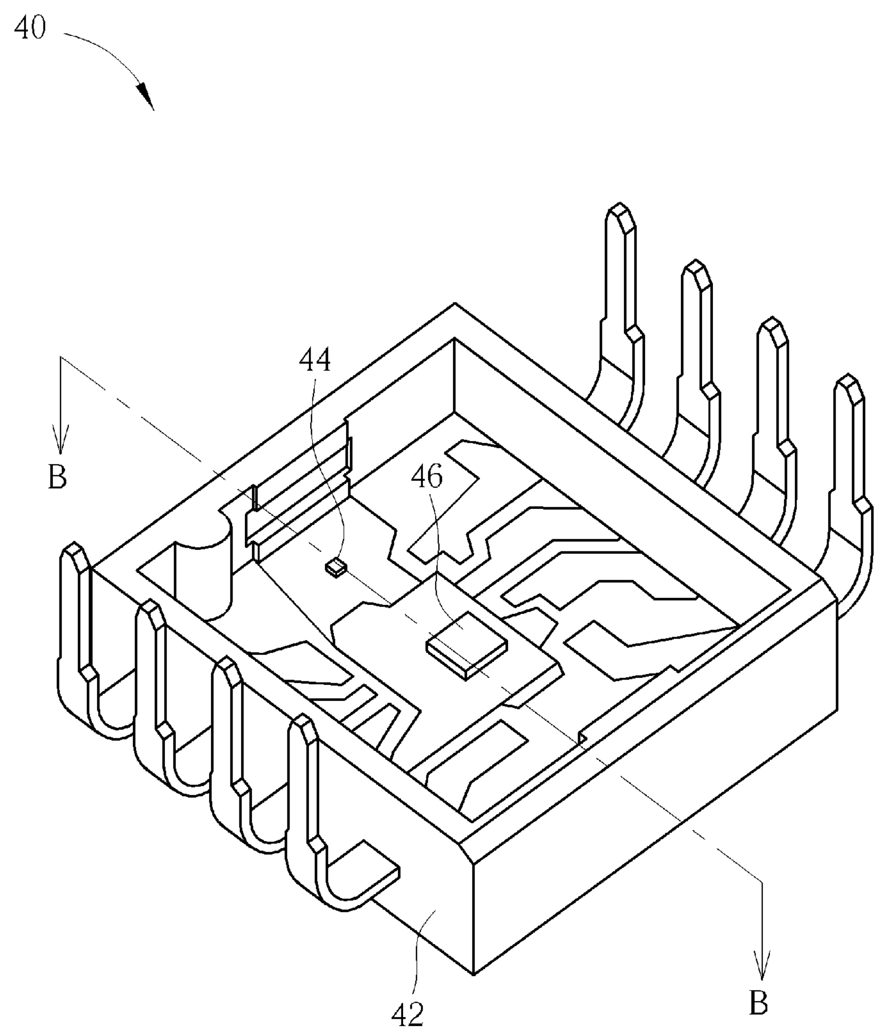
FIG. 1 is a diagram of an optical detecting module in prior art.
Figure 2:
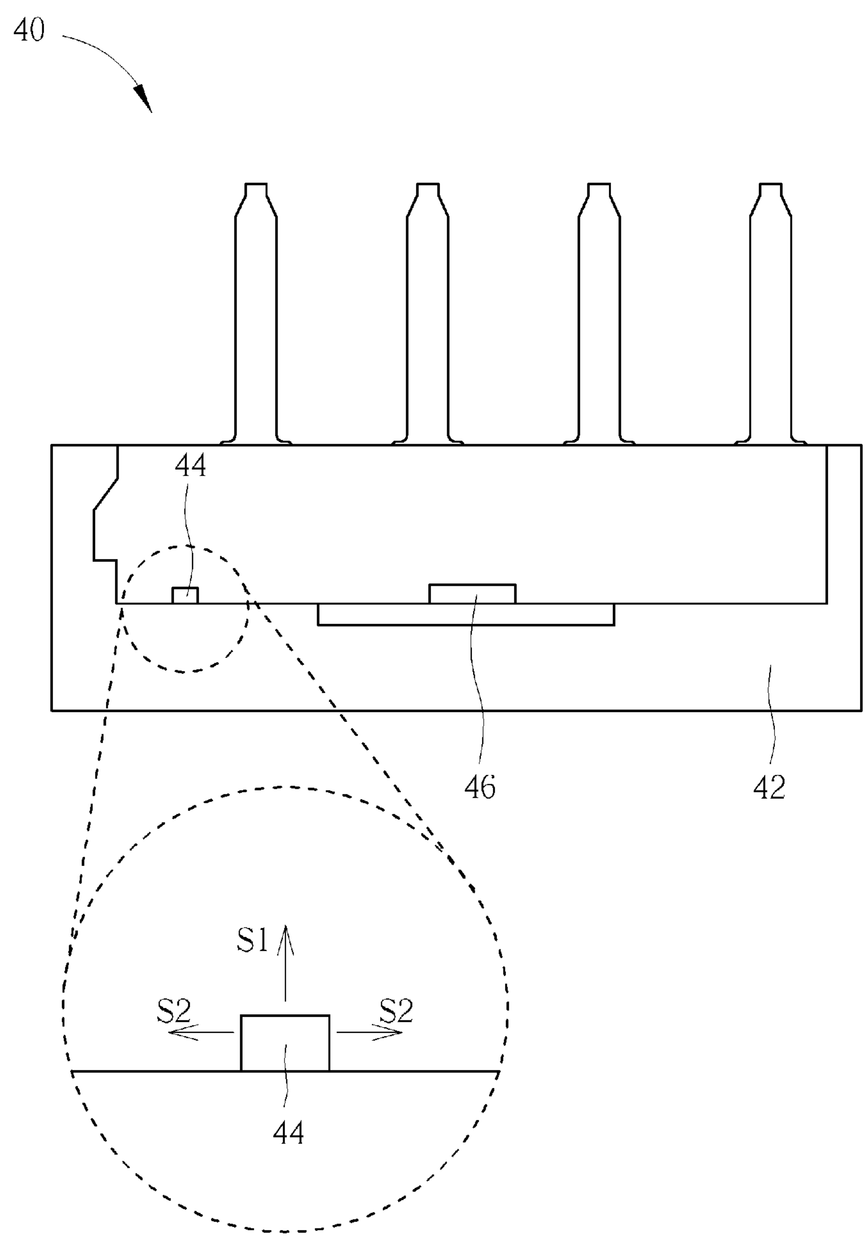
FIG. 2 is a sectional view of the optical detecting module in prior art.
Figure 3:
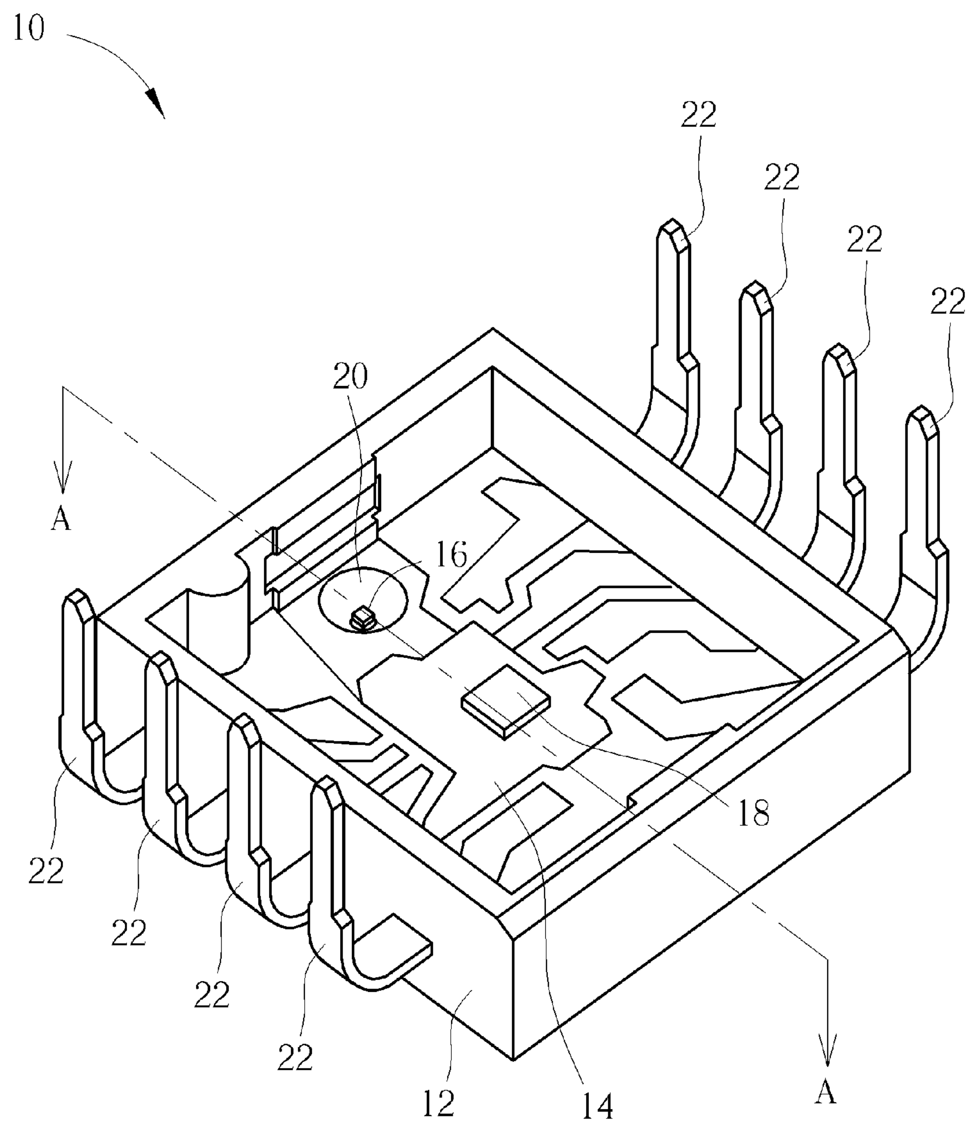
FIG. 3 is a diagram of an optical detecting module according to an embodiment of the present invention.

Please refer to FIG. 3. FIG. 3 is a diagram of an optical detecting module 10 according to an embodiment of the present invention. The optical detecting module 10 can be applied to an optical mouse, to increase light utilization efficiency of the optical mouse by gathering light beams. The optical detecting module 10 includes a housing 12, a lead frame 14, a light emitting component 16, an optical detecting component 18 and an optical signal collecting component 20. The lead frame 14 is disposed inside the housing 12 and electrically connected to pins 22 of the housing 12. The light emitting component 16 and the optical detecting component 18 are disposed inside the housing 12 via the lead frame 14. The optical detecting module 10 can be connected with a circuit board (not shown in the figure) by the dual in-line package (iDIP) technique, and the light emitting component 16 and the optical detecting component 18 are electrically connected to the circuit board through the lead frame 14 and the pins 22 for signal transmission. The light emitting component 16 emits the optical detecting signal to project out of the housing 12, and the optical detecting component 18 receives the optical detecting signal reflected from an external object, so as to acquire information of the external object according to parameter variation of the optical detecting signal. For increasing the light utilization efficiency, the light emitting component 16 is preferably disposed inside the optical signal collecting component 20, which means the light emitting component 16 can be disposed on the lead frame 14 via the optical signal collecting component 20.

Figure 4:
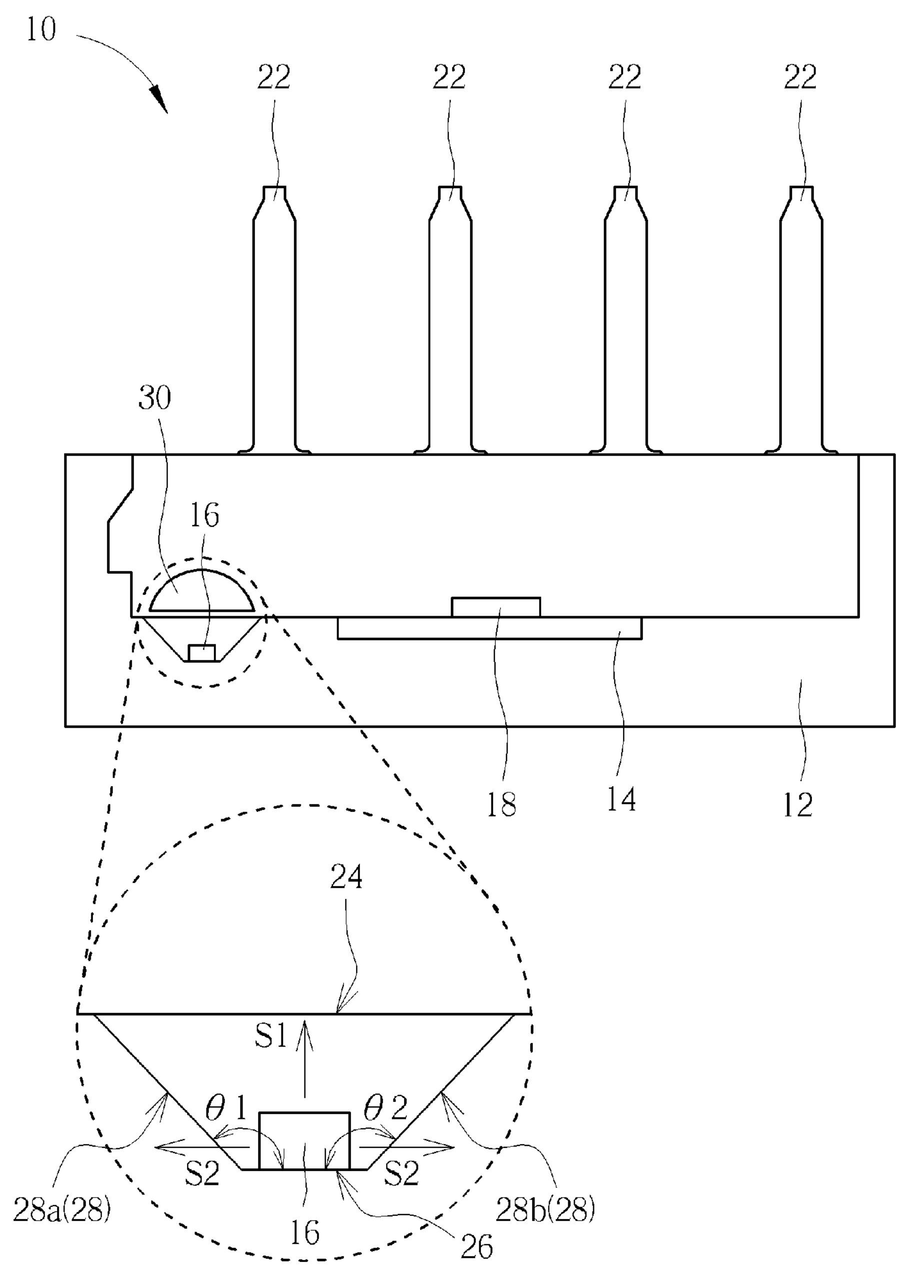
FIG. 4 is a sectional view of the optical signal collecting component according to the first embodiment of the present invention.

Please refer to FIG. 4. FIG. 4 is a sectional view of optical signal collecting component 20 shown in FIG. 3 along line A-A, to indicate structural characteristics of the optical detecting module 10 in the first embodiment of the present invention. The optical signal collecting component 20 mainly includes an output portion 24, a bottom portion 26 and a lateral portion 28. The lateral portion 28 is bent from the bottom portion 26, the bottom portion 26 is connected with the lateral portion 28 to form a sunken structure, and the output portion 24 is an opening of the sunken structure. Characteristics of the sunken structure can be shown as the optical signal collecting component 20 in FIG. 3. The light emitting component 16 can be an omni-directional light source with wide-angle illumination, and the optical detecting signal output by the light emitting component 16 may include an optical positive signal S1 and an optical lateral signal S2. The light emitting component 16 is disposed on the bottom portion 26 inside the sunken structure, the optical positive signal S1 output by the light emitting component 16 is directly projected out of the housing 12 through the output portion 24, and the optical lateral signal S2 output by the light emitting component 16 is projected onto the lateral portion 28. The optical lateral signal S2 can be reflected by the lateral portion 28 to project out of the housing 12 through the output portion 24 by means of adjusting material (such as manufacturing the lateral portion 28 by reflective metal material) and structural characteristics (such as changing the angle formed between the lateral portion 28 and the bottom portion 26) of the lateral portion 28.

The lateral portion 28 may be defined as including a first lateral portion **28*a* and a second lateral portion 28*b*, respectively connected with two opposite sides of the bottom portion 26. As shown in FIG. 4, the first lateral portion 28*a* and the second lateral portion 28*b* are walls adjacent by the two opposite sides of the bottom portion 26. As shown in FIG. 3, the first lateral portion 28*a* and the second lateral portion 28*b* can be the same wall of the sunken structure, and respectively belong to different regions on the foresaid wall. The first lateral portion 28*a* is bent relative to the bottom portion 26 to form a first angle θ1, and the second lateral portion 28*b* is bent relative to the bottom portion 26 to form a second angle θ2. In the first embodiment, the first angle θ1 is substantially equal to the second angle θ2, the optical lateral signal S2 can be turned to top of the light emitting component 16 by reflection of the first lateral portion 28*a* and the second lateral portion 28*b***.

The optical detecting module 10 can optionally include an optical modulating component 30 disposed above the output portion 24 or filled inside the optical signal collecting component 20. The optical modulating component 30 can be the convex lens, the plane-convex lens or the double-convex lens with light condensation. The optical modulating component 30 is utilized to condense the optical positive signal S1 and the optical lateral signal S2 of the optical detecting signal, and can be obliquely positioned to adjust an outputting angle of the optical detecting signal according to design demand, so that the optical detecting signal can be guided to accurately point toward an effective region (such as the working region) of the optical detecting module 10, to effectively provide preferred light utilization efficiency and to decrease signal-noise ratio of the optical detecting module 10.

Figure 5:
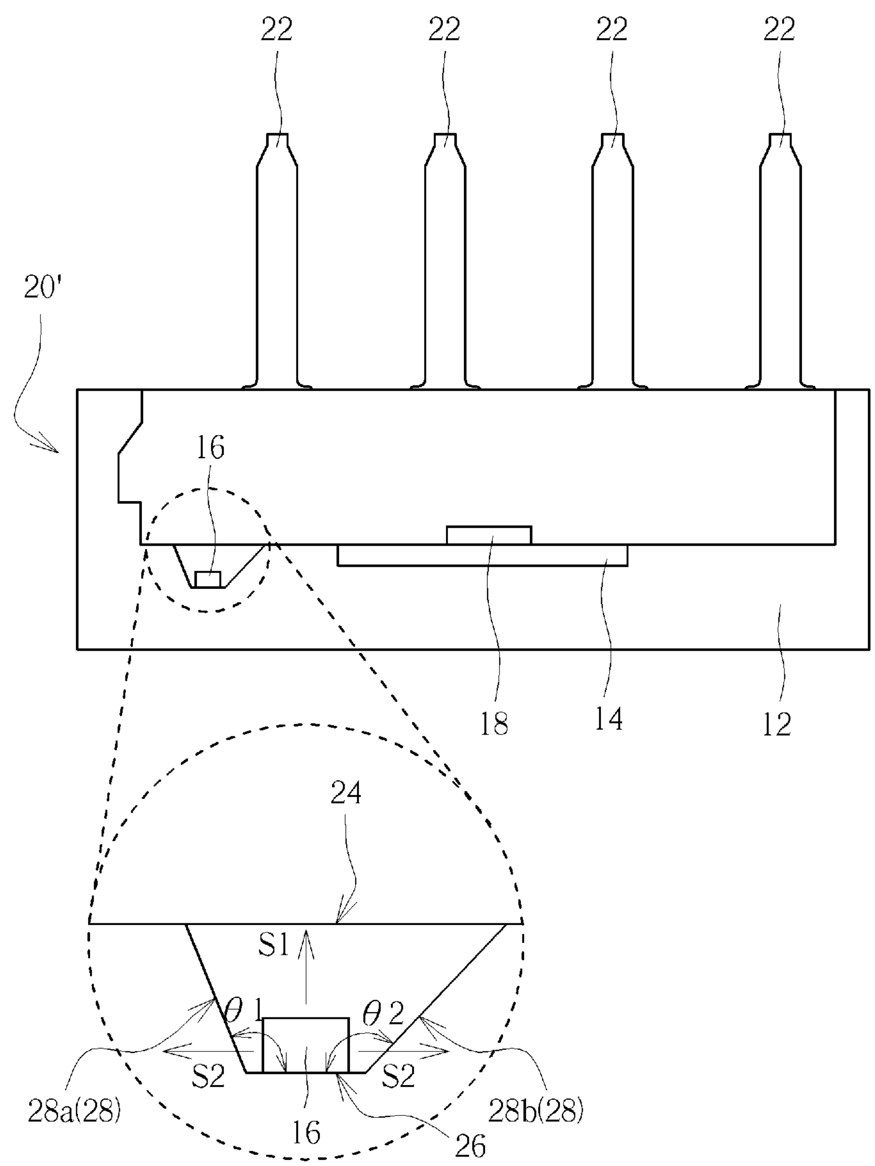
FIG. 5 is a sectional view of the optical signal collecting component according to the second embodiment of the present invention.

Please refer to FIG. 5. FIG. 5 is a sectional view of the optical signal collecting component 20' according to a second embodiment of the present invention. In the second embodiment, elements having the same numeral as ones of the first embodiment have the same structures and functions, and a detailed description is omitted herein for simplicity. Difference between the first embodiment and the second embodiment is: the angles of the bottom portion 26 relative to the first lateral portion **28*a* and/or the second lateral portion 28*b* are optionally varied in the second embodiment, which means the first angle θ1 is different from the second angle θ2. As shown in FIG. 5, the second lateral portion 28*b* of the optical signal collecting component 20' is defined as the at least one lateral portion located between the optical detecting component 18 and the first lateral portion 28*a*, the first angle θ1 is smaller than the second angle θ2, and the optical lateral signal S2 output by the light emitting component 16 tends to transmit toward the optical detecting component 18 by reflection of the first lateral portion 28*a*, so as to increase detection accuracy of the optical detecting module 10 accordingly. Angle relation between the first angle θ1 and the second angle θ2** is not limited to the above-mentioned embodiment, which depends on actual demand.

In the foresaid first embodiment and second embodiment, the first angle θ1 and the second angle θ2 may be preferably ranged between 110 degrees and 160 degrees. While the bottom portion 26 of the optical signal collecting component 20, 20' is substantially parallel to the lead frame 14, which means a bottom surface normal vector V1 of the bottom portion 26 is parallel to a planar normal vector V2 of the lead frame 14 (as shown in FIG. 4), a reflective direction of the optical lateral signal S2 can be adjusted by variation of the first angle θ1 and the second angle θ2. As the angle between the bottom portion 26 and the lateral portion 28 is greater than 90 degrees, the optical signal collecting component 20, 20' has function of reflecting the optical lateral signal S2, and the optical modulating component 30 is further applied to adjust the outputting angle of the optical detecting signal collectively. Values of the first angle θ1 and the second angle θ2 are not limited to the above-mentioned embodiment, which depends on actual demand.

Figure 6:
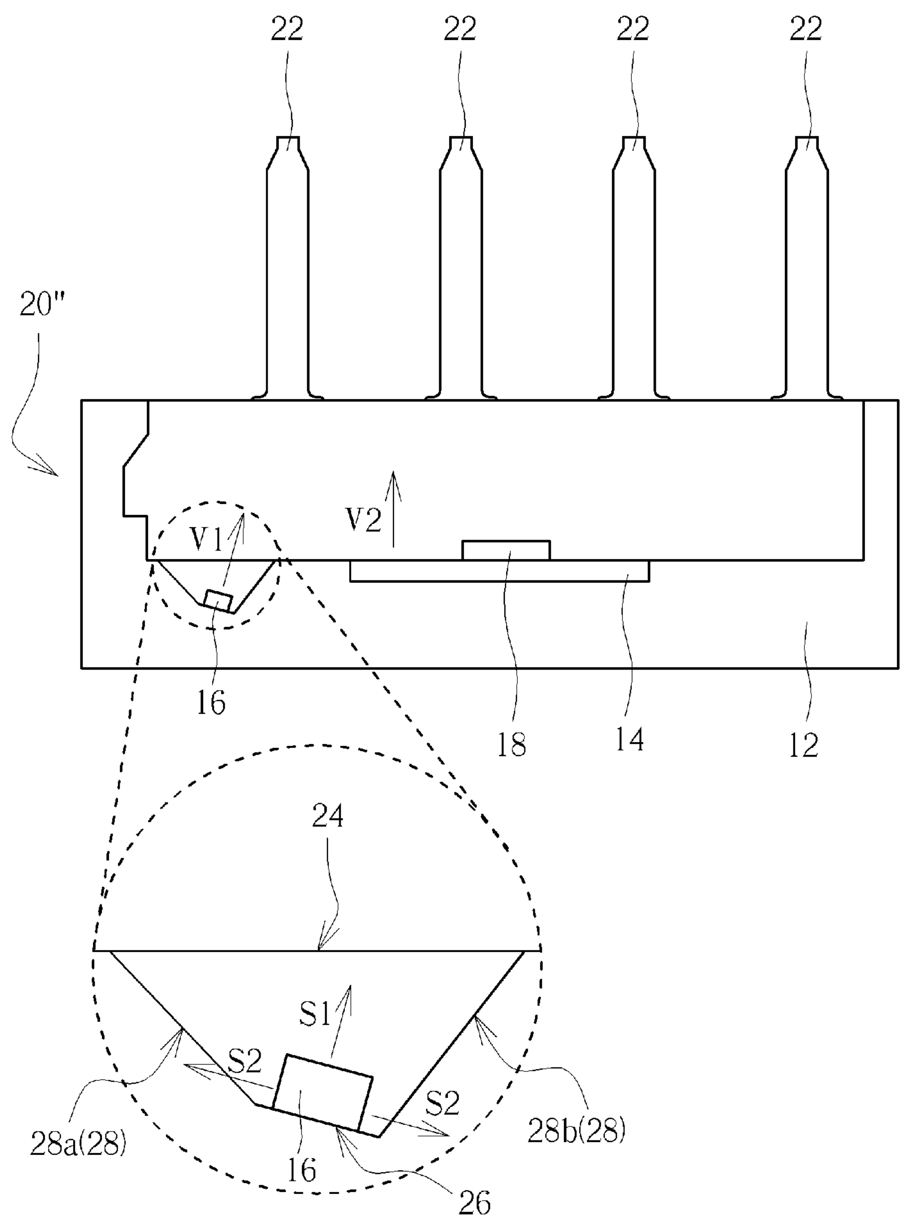
FIG. 6 is a sectional view of the optical signal collecting component according to the third embodiment of the present invention.

Please refer to FIG. 6. FIG. 6 is a sectional view of the optical signal collecting component 20" according to a third embodiment of the present invention. In the third embodiment, elements having the same numeral as ones of the above-mentioned embodiments have the same structures and functions, and a detailed description is omitted herein for simplicity. Difference between the third embodiment and the above-mentioned embodiments is: the bottom surface normal vector V1 of the bottom portion 26 of the optical signal collecting component 20" is not parallel to the planar normal vector V2 of the lead frame 14, and the bottom surface normal vector V1 is preferably slanted toward the optical detecting component 18, so that the optical signal collecting component 20" can guide the optical positive signal S1 and the optical lateral signal S2 of the optical detecting signal to point toward the effective region of the optical detecting module 10. Moreover, the above-mentioned optical modulating component 30 can be disposed on the optical signal collecting component 20" to cooperatively adjust the outputting angle of the optical detecting signal.

In conclusion, the present invention utilizes the optical signal collecting component to hold the light emitting component, the specific structure of the optical signal collecting component can be applied to gather and reflect the optical lateral signal output by the light emitting component, both the optical positive signal and the optical lateral signal of the optical detecting signal are projected onto the external object through the output portion, the optical lateral signal is employed effectively without consumption, and the optical detecting module can provide preferred light utilization efficiency in low-energy mode. The optical signal collecting component of the present invention can be integrated with the lead frame monolithically, or be an independent unit additionally disposed on the lead frame; for example, the optical signal collecting component may be formed on the lead frame by impact molding technique. Comparing to the prior art, the present invention disposes the optical signal collecting component inside the optical detecting module to gather the optical lateral signal output by the light emitting component, and has an advantage of the preferred light utilization efficiency because light receiving quantity of the optical detecting component is increased with low-energy consumption of the light emitting component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting module with preferred light utilization efficiency, the optical detecting module comprising:
- a housing;
- a light emitting component disposed inside the housing;
- an optical detecting component disposed inside the housing and adapted to receive an optical detecting signal generated by the light emitting component; and
- an optical signal collecting component adapted to hold the light emitting component, the optical signal collecting component comprising:
  - an output portion;
  - a bottom portion whereon the light emitting component is disposed, an optical positive signal of the optical detecting signal being projected out of the housing through the output portion;
  - at least one lateral portion bent from the bottom portion and adapted to reflect an optical lateral signal of the optical detecting signal, the optical lateral signal being turned to the output portion by reflection so as to project out of the housing.

2. The optical detecting module of claim 1, further comprising:
- a lead frame disposed inside the housing, the optical signal collecting component being formed on the lead frame.

3. The optical detecting module of claim 1, wherein the bottom portion and the at least one lateral portion are connected to form a sunken structure, the light emitting component is disposed inside the sunken structure, and the output portion is an opening of the sunken structure.

4. The optical detecting module of claim 1, wherein the at least one lateral portion includes a first lateral portion and a second lateral portion respectively connected with two opposite sides of the bottom portion, a first angle is formed between the first lateral portion and the bottom portion, and a second angle is formed between the second lateral portion and the bottom portion.

5. The optical detecting module of claim 4, wherein the first angle is substantially equal to the second angle.

6. The optical detecting module of claim 4, wherein the first angle is substantially smaller than the second angle, the second lateral portion is located between the optical detecting component and the first lateral portion.

7. The optical detecting module of claim 4, wherein the first angle and the second angle are ranged between 110 degrees and 160 degrees.

8. The optical detecting module of claim 2, wherein a bottom surface normal vector of the bottom portion is not parallel to a planar normal vector of the lead frame, and the bottom surface normal vector is slanted toward the optical detecting component.

9. The optical detecting module of claim 2, wherein optical signal collecting component is formed on the lead frame by impact molding technique.

10. The optical detecting module of claim 1, further comprising:
- an optical modulating component disposed above the output portion and adapted to adjust an outputting angle of the optical detecting signal.

11. The optical detecting module of claim 1, wherein the optical detecting module is connected with a circuit board by dual in-line package (iDIP) technique.

* * * * *